US012779926B2

(12) United States Patent
Miyagawa et al.

(10) Patent No.: US 12,779,926 B2
(45) Date of Patent: Nov. 3, 2026

(54) ELECTRONICALLY CONTROLLED SUSPENSION

(71) Applicant: SUZUKI MOTOR CORPORATION, Hamamatsu (JP)

(72) Inventors: Keitaro Miyagawa, Hamamatsu (JP); Koji Kobayashi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/915,527

(22) Filed: Oct. 15, 2024

(65) Prior Publication Data

US 2025/0144968 A1 May 8, 2025

(30) Foreign Application Priority Data

Nov. 2, 2023 (JP) ................................ 2023-188361

(51) Int. Cl.
*B60G 17/018* (2006.01)

(52) U.S. Cl.
CPC ........ *B60G 17/018* (2013.01); *B60G 2300/12* (2013.01); *B60G 2400/204* (2013.01); *B60G 2500/10* (2013.01)

(58) Field of Classification Search
CPC .............. B60G 17/018; B60G 2300/12; B60G 2400/204; B60G 2500/10; B60G 2600/02; B60G 2600/20; B60G 17/06
See application file for complete search history.

(56) References Cited

U.S. PATENT DOCUMENTS 5,632,503 A 5/1997 Raad et al. .................. 280/707

FOREIGN PATENT DOCUMENTS

EP 3489048 A1 * 5/2019 ......... B60G 17/0161
JP S 58-056907 A 4/1983
JP 2010167907 A * 8/2010

OTHER PUBLICATIONS

Machine Translation of EP 3489048 A1 PDF File Name: “EP3489048A1_Machine_Translation.pdf” (Year: 2019).*
Machine Translation of JP 2010167907 A PDF File Name: “JP2010167907A_Machine_Translation.pdf” (Year: 2010).*
Extended European Search Report issued to European Application No. 24206996.1 on Mar. 26, 2025.

* cited by examiner

*Primary Examiner* — Grant Moubry
*Assistant Examiner* — Ruben Picon-Feliciano
(74) *Attorney, Agent, or Firm* — Stein IP LLC

(57) ABSTRACT

An electronically controlled suspension includes a suspension configured to damp vibration of a wheel of a saddle-riding vehicle, an actuator configured to change a damping force of the suspension, an operation device configured to receive a selection of a damping specification among a plurality of damping specifications for low vehicle speed, and a controller configured to operate the actuator with the damping specification for low vehicle speed or a damping specification for high vehicle speed. The controller is configured to apply any damping specification for low vehicle speed, during low-speed traveling at a speed equal to or lower than a predetermined speed. The controller is configured to automatically apply the damping specification for high vehicle speed, during high-speed traveling at a speed exceeding the predetermined speed.

12 Claims, 8 Drawing Sheets

ELECTRONICALLY CONTROLLED SUSPENSION

CROSS-REFERENCE TO RELATED APPLICATIONS

This application is based on and claims priority under 35 USC 119 from Japanese Patent Application No. 2023-188361 filed on Nov. 2, 2023, the entire content of which is incorporated herein by reference.

TECHNICAL FIELD

The present disclosure relates to an electronically controlled suspension.

BACKGROUND ART

It is known to use an electronically controlled suspension capable of electrically controlling a damping force in a saddle-riding vehicle (see JP2010-167907A). In a controller of an electronically controlled suspension described in JP2010-167907A, a damping specification for low vehicle speed and a damping specification for high vehicle speed with respect to a front suspension and a rear suspension are stored. When a vehicle speed is below a first vehicle speed, the damping specification for low vehicle speed is applied to each suspension, when the vehicle speed exceeds the first vehicle speed, a switch from the damping specification for low vehicle speed to the damping specification for high vehicle speed begins, and when the vehicle speed reaches or exceeds a second vehicle speed, the damping specification for high vehicle speed is applied to each suspension.

An optimal damping specification varies depending on a vehicle speed, a road surface condition, a traveling condition, a preference of a rider, and the like. For example, although it is desirable to increase a damping force in order to stabilize a vehicle during sports traveling, it is desirable to decrease the damping force in order to improve riding comfort during traveling on a rugged road. During high-speed traveling, the level of the damping force greatly affects traveling stability compared with during low-speed traveling. In the electronically controlled suspension described in JP2010-167907A, the damping specification for low vehicle speed and the damping specification for high vehicle speed are prepared for each traveling condition such as sports traveling, but since the damping specification for high vehicle speed depends on the damping specification for low vehicle speed, there is a risk that an optimal damping specification cannot be set.

SUMMARY OF INVENTION

Aspect of non-limiting embodiments of the present disclosure relates to provide an electronically controlled suspension capable of improving traveling stability and riding comfort by setting an optimal damping specification.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an electronically controlled suspension including:

a suspension configured to damp vibration of a wheel of a saddle-riding vehicle;

an actuator configured to change a damping force of the suspension;

an operation device configured to receive a selection of a damping specification among a plurality of damping specifications for low vehicle speed; and a controller configured to operate the actuator with the damping specification for low vehicle speed or a damping specification for high vehicle speed, in which the controller is configured to apply any damping specification for low vehicle speed, during low-speed traveling at a speed equal to or lower than a predetermined speed, and the controller is configured to automatically apply the damping specification for high vehicle speed, during high-speed traveling at a speed exceeding the predetermined speed.

According to an aspect of the present disclosure, there is provided an electronically controlled suspension including:

a suspension configured to damp vibration of a wheel of a saddle-riding vehicle;

an actuator configured to change a damping force of the suspension;

an operation device configured to receive a selection of a damping specification among a plurality of damping specifications; and a controller configured to operate the actuator with the selected damping specification, in which the number of damping specifications that are allowed to be selected during high-speed traveling at a speed exceeding a predetermined speed is smaller than the number of damping specifications that are allowed to be selected during low-speed traveling at a speed equal to or lower than the predetermined speed.

BRIEF DESCRIPTION OF DRAWINGS

Exemplary embodiment(s) of the present invention will be described in detail based on the following figures, wherein.

DESCRIPTION OF EMBODIMENTS

Figure 1:
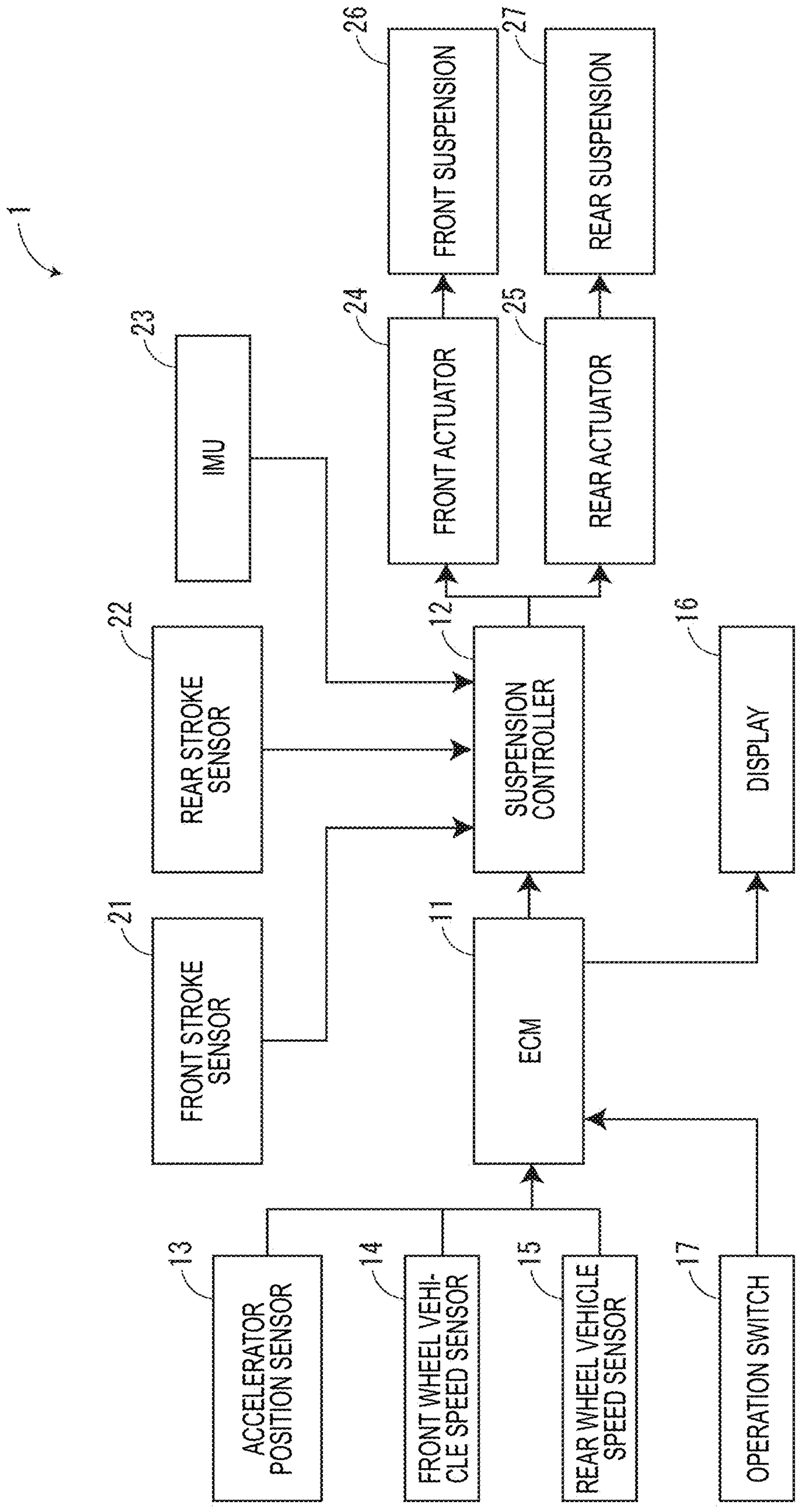
FIG. 1 is a schematic diagram illustrating an electronically controlled suspension according to the present embodiment.

In an electronically controlled suspension according to one aspect of the present disclosure, vibration of a wheel of a saddle-riding vehicle is damped by the suspension, and a damping force of the suspension is changed by an actuator. An operation device is configured to receive a selection of a damping specification among a plurality of damping specifications for low vehicle speed, and a controller is configured to apply the selected damping specification for low vehicle speed according to a traveling condition, a road surface condition, and the like during low-speed traveling at a speed equal to or lower than a predetermined speed. The actuator is operated under the damping specification for low vehicle speed by the controller, and the damping force of the suspension is appropriately adjusted in consideration of traveling stability, riding comfort, and the like. The controller automatically applies a damping specification for high vehicle speed during high-speed traveling at a speed exceeding the predetermined speed. The actuator is operated under the damping specification for high vehicle speed by the controller, and the damping force of the suspension is appropriately adjusted without depending on the damping force during low-speed traveling, and the traveling stability is improved.

Embodiment

An electronically controlled suspension is adopted in a saddle-riding vehicle according to the present embodiment. In general, in an electronically controlled suspension, damping specifications having different characteristics such as hard, medium, and soft are prepared. For example, a posture of the vehicle can be easily stabilized by adopting the "hard" damping specification with a high damping force during sports traveling. During traveling on a rugged road, vibration to the vehicle is alleviated by adopting the "soft" damping specification with a low damping force. It is desirable to select a desired damping specification from a plurality of damping specifications according to a traveling condition, a road surface condition, and the like during low-speed traveling. In particular, a user can easily feel a difference in the damping specification by adding a large difference to the damping forces of the plurality of damping specifications.

In general electronically controlled suspensions, the posture of the vehicle is stabilized by increasing the damping force of the damping specification with an acceleration in a vehicle speed. During traveling on a rugged road with the "soft" damping specification applied, the vehicle is often in low-speed traveling, and excessive damping rarely occurs, whereas during high-speed traveling in sports traveling with the "hard" damping specification applied, there is a risk of excessive damping. In the electronically controlled suspension according to the present embodiment, the damping specification for low vehicle speed can be selected according to the road surface condition or the like during low-speed traveling, and the damping specification for high vehicle speed that is independent of the damping specification for low vehicle speed is automatically applied during high-speed traveling, whereby stable driving is ensured.

Hereinafter, the electronically controlled suspension according to the present embodiment will be described with reference to the accompanying drawings. FIG. 1 is a block diagram of the electronically controlled suspension according to the present embodiment.

As illustrated in FIG. 1, an electronically controlled suspension 1 is provided with an Electronic Control Module (ECM) 11 and a suspension controller 12 as controllers. An accelerator position sensor 13, a front wheel vehicle speed sensor 14, and a rear wheel vehicle speed sensor 15 are connected to the ECM 11. The ECM 11 is configured to detect the vehicle speed based on at least one detection result of the accelerator position sensor 13, the front wheel vehicle speed sensor 14, and the rear wheel vehicle speed sensor 15. A display 16 and an operation switch 17 are connected to the ECM 11. Display of the display 16 is controlled by the ECM 11 according to an operation signal of the operation switch 17.

A setting screen for damping control is displayed on the display 16. The operation switch 17 is configured to receive an operation for the setting screen of the display 16. A plurality of damping specification for low vehicle speed and a single damping specification for high vehicle speed are stored in the ECM 11. Only during low-speed traveling at a vehicle speed equal to or lower than a predetermined speed Va, a damping specification can be selected among the plurality of damping specifications for low vehicle speed by an operation of the operation switch 17. During high-speed traveling at a vehicle speed exceeds the predetermined speed Va, the damping specification for high vehicle speed is automatically applied by the ECM 11. In the ECM 11, a control signal is generated based on the damping specification and an adjustment amount of the damping force. Details of selection processing of the damping specification and adjustment processing of the damping force will be described later.

A front stroke sensor 21, a rear stroke sensor 22, an inertial measurement unit (IMU) 23, a front actuator 24, and a rear actuator 25 are connected to the suspension controller 12. In the suspension controller 12, in addition to the control signal input from the ECM 11, operation signals of the front actuator 24 and the rear actuator 25 are generated based on detection signals of the front stroke sensor 21, the rear stroke sensor 22, and the IMU 23. The front actuator 24 and the rear actuator 25 are configured to operate under the damping specification for low vehicle speed or the damping specification for high vehicle speed, based on the operation signals.

A damping force of a front suspension 26 is changed by the front actuator 24. Vibration of a front wheel (not illustrated) of the saddle-riding vehicle is damped by the front suspension 26. A damping force of a rear suspension 27 is changed by the rear actuator 25. Vibration of a rear wheel (not illustrated) of the saddle-riding vehicle is damped by the rear suspension 27. The ECM 11 may be configured to generate the operation signals for the actuators 24 and 25, or the suspension controller 12 may be configured to generate the control signals for the damping force. That is, the controller may be implemented by either the ECM 11 or the suspension controller 12.

Each processing of the ECM 11 and the suspension controller 12 may be realized by software using a processor, or may be realized by a logic circuit (hardware) formed in an integrated circuit or the like. When the processor is used, the processor reads and executes a program stored in a memory, thereby performing various processing. As the processor, for example, a central processing unit (CPU) is used. Further, the memory is implemented by one or more storage media such as a read only memory (ROM) and a random access memory (RAM) according to the use.

Figure 2:
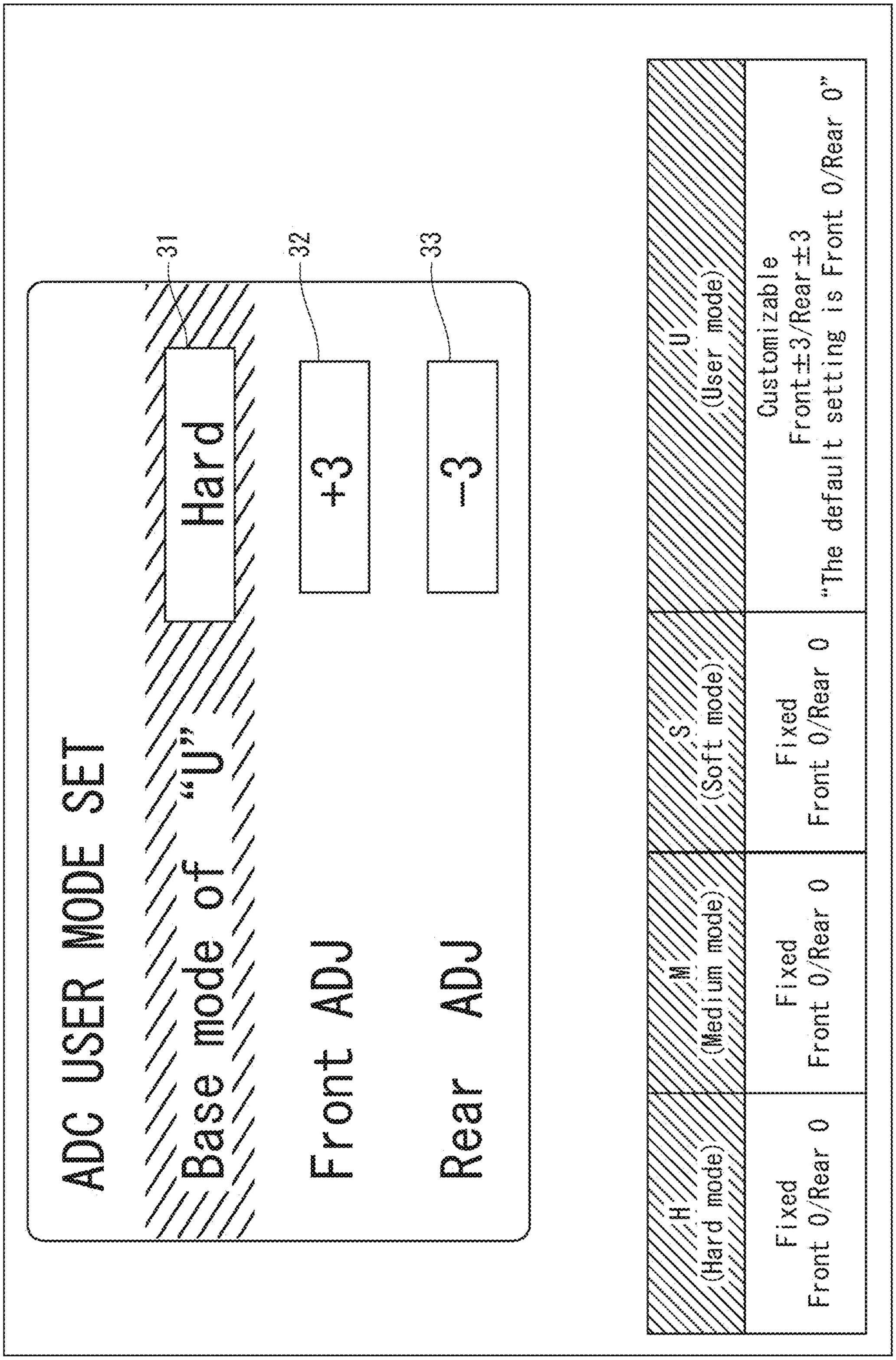
FIG. 2 is a diagram illustrating a setting screen for damping control during low-speed traveling according to the present embodiment.
Figure 3:
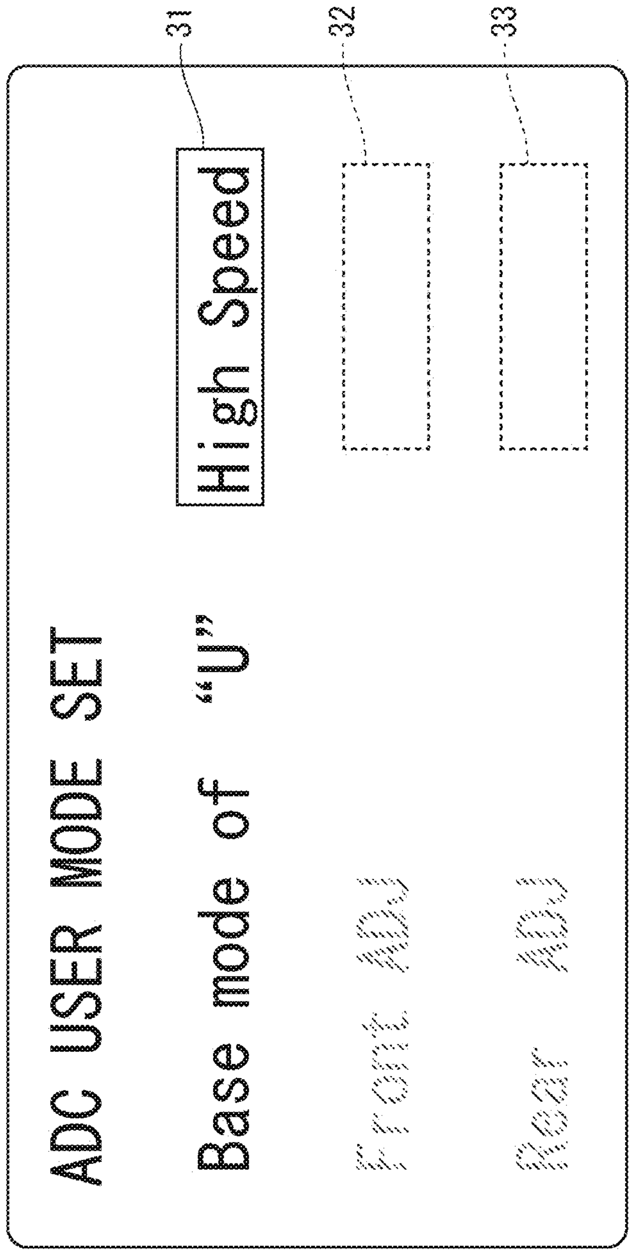
FIG. 3 is a diagram illustrating a setting screen for damping control during high-speed traveling according to the present embodiment.
Figure 4:
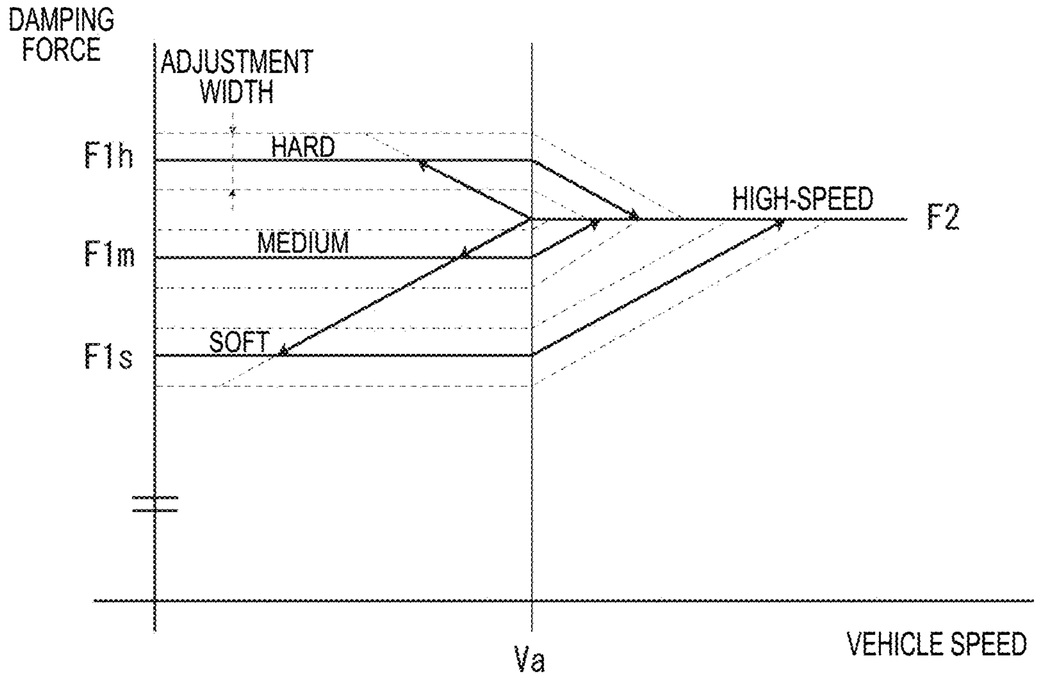
FIG. 4 is a diagram illustrating a relation between a speed and a damping force for each damping specification according to the present embodiment.

Referring to FIGS. 2 to 4, the selection processing of the damping specification and the adjustment processing of the damping force will be described. FIG. 2 is a diagram illustrating a setting screen for damping control during low-speed traveling according to the present embodiment. FIG. 3 is a diagram illustrating a setting screen for damping control during high-speed traveling according to the present embodiment. FIG. 4 is a diagram illustrating a relation between a speed and a damping force for each damping specification according to the present embodiment. In FIGS. 2 to 4, reference numerals in FIG. 1 are used for description.

As illustrated in FIG. 2, the setting screen for the damping control is displayed on the display 16. The setting screen for the damping control includes a base mode setting field 31, and damping force adjustment fields 32 and 33 of the suspensions 26 and 27. During low-speed traveling at a speed equal to or lower than the predetermined speed Va, the display 16 is controlled by the ECM 11, and the base mode setting field 31 and the damping force adjustment fields 32 and 33 are activated. The operation switch 17 receives the selection of a damping specification among the three types of damping specifications for low vehicle speed in the base mode setting field 31. In the present embodiment, any damping specification can be selected among the damping specifications for low vehicle speed in the hard mode, the medium mode, and the soft mode.

In the hard mode, the damping force is adjusted to be high in a manner that pistons in dampers of the suspensions 26 and 27 are less likely to move, and expansion and contraction amounts of the suspensions 26 and 27 are reduced, and a posture change during acceleration or deceleration or turning is prevented. In the soft mode, the damping force is adjusted to be low in a manner that the pistons in the dampers of the suspensions 26 and 27 are likely to move, and the expansion and contraction amounts of the suspensions 26 and 27 are increased, and transmission of vibration to a rider during traveling on a rugged road or the like is prevented. In the medium mode, the damping force is adjusted to an intermediate damping force between the hard mode and the soft mode, and the expansion and contraction amounts of the suspensions 26 and 27 become appropriate.

The operation switch 17 receives the adjustment of the damping force based on the damping specification for low vehicle speed in the damping force adjustment fields 32 and 33. An adjustment value of the damping force of each of the damping specifications for low vehicle speed is "0" by default, and the adjustment value of the damping force is changed in seven steps between "+3" and "−3" according to a preference of the rider for the suspensions 26 and 27. During low-speed traveling, the base damping force is set according to the damping specification for low vehicle speed, and the damping force is finely adjusted based on the default damping force of the damping specification for low vehicle speed. In the ECM 11, the control signal is generated based on the damping specification for low vehicle speed and the adjustment value of the damping force.

In this way, during low-speed traveling, the ECM 11 applies any damping specification for low vehicle speed selected from the damping specifications for low vehicle speed in the hard mode, the medium mode, and the soft mode, and the damping force of the damping specification for low vehicle speed can be adjusted stepwise. A stepwise adjustment width of the damping force is smaller than an adjustment width of the damping force realized by the selection of the damping specification for low vehicle speed. During low-speed traveling, the operation switch 17 receives the selection of the damping specification for low vehicle speed, and thus the damping specification for low vehicle speed can be changed as desired according to changes in the road surface condition, the traveling condition, and the like. Further, during low-speed traveling, the operation switch 17 may receive the adjustment of the damping force based on the damping specification for low vehicle speed.

Low-speed traveling is general in a road surface condition such as a rugged road in which the soft mode is preferred, and convenience of the rider is improved by switching the damping specifications among the soft mode, the hard mode, and the medium mode during low-speed traveling. A difference of the damping force has a large influence on the traveling stability during high-speed traveling, and a high-speed traveling condition is also limited, and thus switching of the damping specification is not required as in low-speed traveling. In particular, attention to driving is required during high-speed traveling, and it is desirable to cause the rider to concentrate on operation rather than increasing the number of selection branches of the damping specifications. Therefore, in the present embodiment, the damping specification for high vehicle speed is automatically applied by the ECM 11 during high-speed traveling.

As illustrated in FIG. 3, specifically, during high-speed traveling at a speed exceeding the predetermined speed Va, the display 16 is controlled by the ECM 11, and the base mode setting field 31 and the damping force adjustment fields 32 and 33 are grayed out. The operation switch 17 is prohibited from selecting any damping specification and adjusting the damping force based on the damping specification. The damping specification for high vehicle speed in a high-speed mode is automatically applied by the ECM 11, and the damping specification for high vehicle speed is fixed to the default damping force. During high-speed traveling, the damping force is adjusted to an appropriate damping force without being adjusted by the rider on the operation device. In the ECM 11, the control signal is generated based on the damping specification for high vehicle speed.

As illustrated in FIG. 4, in a case where the vehicle speed is accelerated to exceed the predetermined speed Va, the ECM 11 automatically switches the damping specification from the damping specification for low vehicle speed to the damping specification for high vehicle speed. In a case where the vehicle speed is decelerated to or below the predetermined speed Va, the ECM 11 automatically switches the damping specification from the damping specification for high vehicle speed to the damping specification for low vehicle speed. A damping force F1*h* of the damping specification for low vehicle speed in the hard mode is set to be higher than a damping force F2 of the damping specification for high vehicle speed in the high-speed mode. On the other hand, a damping force F1*m* of the damping specification for low vehicle speed in the medium mode and a damping force F1*s* of the damping specification for low vehicle speed in the soft mode are set to be lower than the damping force F2 of the damping specification for high vehicle speed in the high-speed mode. As described above, the adjustment width of the damping force is set for each damping specification for low vehicle speed.

In a case where the damping specification is switched by the ECM 11, the actuators 24 and 25 are operated by the suspension controller 12. During switching from the damping specification for low vehicle speed in the hard mode to the damping specification for high vehicle speed in the high-speed mode, the actuators 24 and 25 are controlled by the suspension controller 12 in a manner of decreasing from the damping force F1*h* to the damping force F2 in accordance with an acceleration from the predetermined speed Va. During switching from the damping specification for high vehicle speed in the high-speed mode to the damping specification for low vehicle speed in the hard mode, the actuators 24 and 25 are controlled by the suspension controller 12 in a manner of increasing from the damping force F2 to the damping force F1*h* in accordance with a deceleration from the predetermined speed Va.

During switching from the damping specifications for low vehicle speed in the medium mode and the soft mode to the damping specification for high vehicle speed in the high-speed mode, the actuators 24 and 25 are controlled by the suspension controller 12 in a manner of increasing from the damping forces F1*m* and F1*s* to the damping force F2 in accordance with an acceleration from the predetermined speed Va. During switching from the damping specification for high vehicle speed in the high-speed mode to the damping specifications for low vehicle speed in the medium mode and the soft mode, the actuators 24 and 25 are controlled by the suspension controller 12 in a manner of decreasing from the damping force F2 to the damping forces F1*m* and F1*s* in accordance with a deceleration from the predetermined speed Va.

At this time, a switching time becomes shorter as the damping force of the damping specification for low vehicle speed is closer to the damping force of the damping specification for high vehicle speed in the high-speed mode. In the present embodiment, the switching time between the damping specification for low vehicle speed in the medium mode and the damping specification for high vehicle speed in the high-speed mode is the shortest. In the ECM 11, a previous damping specification before switching of the damping specification is stored, and when switching from the damping specification for high vehicle speed to the damping specification for low vehicle speed, the damping specification is automatically returned to the previous damping specification for low vehicle speed.

Figure 5:
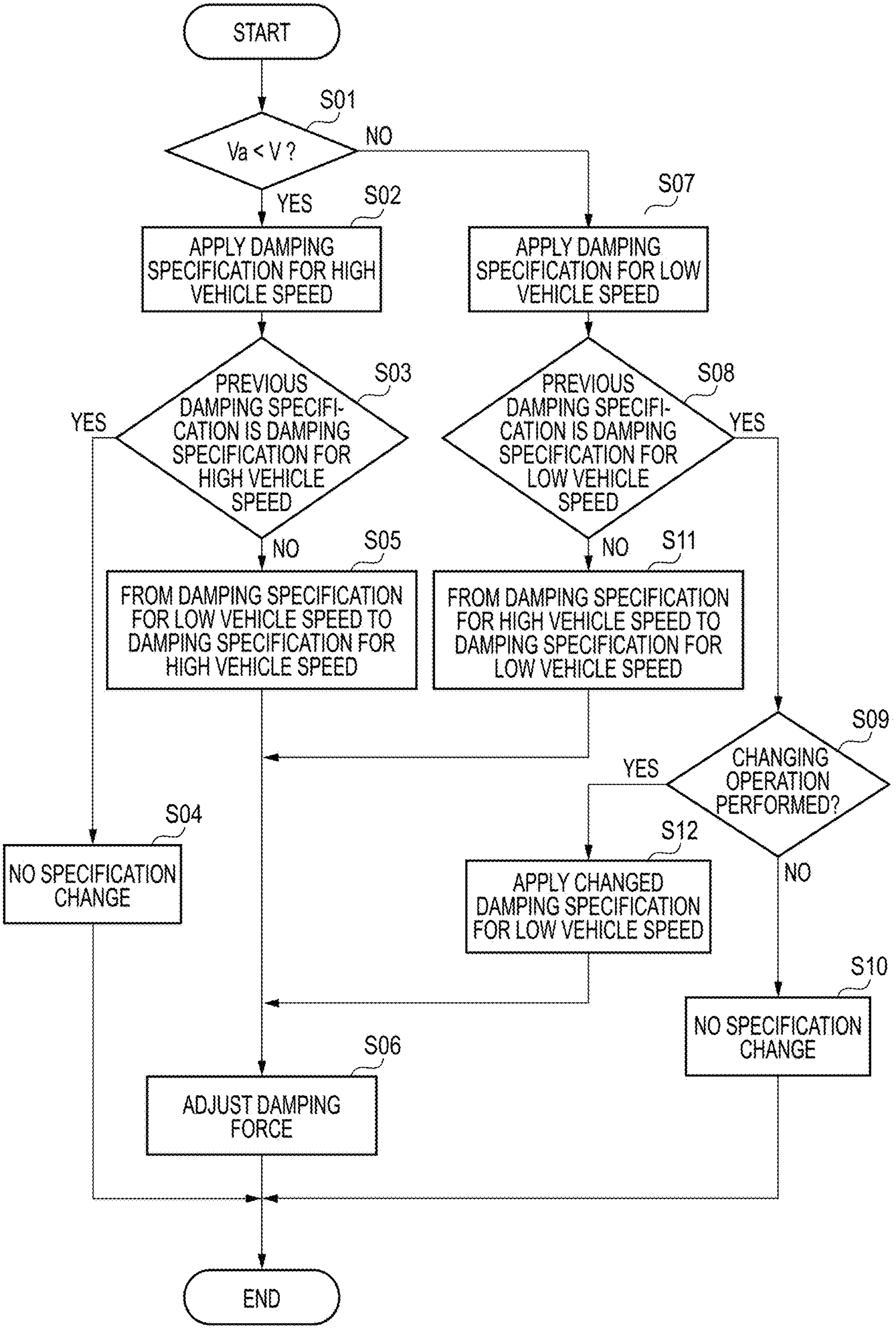
FIG. 5 is a flowchart illustrating a switching operation of the damping specification according to the present embodiment.

A switching operation of the damping specification will be described with reference to FIG. 5. FIG. 5 is a flowchart illustrating the switching operation of the damping specification according to the present embodiment.

As illustrated in FIG. 5, it is determined whether a vehicle speed V is higher than the predetermined speed Va (step S01). In a case where the vehicle speed Vis higher than the predetermined speed Va (Yes in step S01), it is determined that the vehicle is in high-speed traveling, and the damping specification for high vehicle speed is applied by the ECM 11 (step S02). During application of the damping specification for high vehicle speed, the base mode setting field 31 and the damping force adjustment fields 32 and 33 of the display 16 are grayed out, and the changing operation of the damping specification by the operation switch 17 is prohibited. If the previous damping specification is the damping specification for high vehicle speed (Yes in step S03), the ECM 11 determines that there is no specification change, and the processing ends (step S04).

In a case where the previous damping specification is determined to be the damping specification for low vehicle speed in step S03 (No in step S03), the ECM 11 determines to switch from the damping specification for low vehicle speed to the damping specification for high vehicle speed (step S05). Then, a control signal is transmitted from the ECM 11 to the suspension controller 12, operations of the actuators 24 and 25 are controlled by the suspension controller 12, and the damping forces of the suspensions 26 and 27 are changed (step S06). In this way, in a case where the vehicle speed Vis accelerated to exceed the predetermined speed Va, the damping forces of the suspensions 26 and 27 are adjusted by automatically switching from the damping specification for low vehicle speed to the damping specification for high vehicle speed.

On the other hand, in a case where the vehicle speed Vis determined to be equal to or lower than the predetermined speed Va in step S01 (No in step S01), it is determined that the vehicle is in low-speed traveling, and the damping specification for low vehicle speed is applied by the ECM 11 (step S07). During application of the damping specification for low vehicle speed, the base mode setting field 31 and the damping force adjustment fields 32 and 33 of the display 16 are activated, and the operation switch 17 receives the changing operation of the damping specification. In a case where the previous damping specification is the damping specification for low vehicle speed (Yes in step S08) and the changing operation of the damping specification for low vehicle speed is not performed (No in step S09), the ECM 11 determines that there is no specification change, and the processing ends (step S10).

In a case where the previous damping specification is determined to be the damping specification for high vehicle speed in step S08 (No in step S08), the ECM 11 determines to switch from the damping specification for high vehicle speed to the damping specification for low vehicle speed (step S11). Then, a control signal is transmitted from the ECM 11 to the suspension controller 12, operations of the actuators 24 and 25 are controlled by the suspension controller 12, and the damping forces of the suspensions 26 and 27 are changed (step S06). In this way, in a case where the vehicle speed V is decelerated to or below the predetermined speed Va, the damping forces of the suspensions 26 and 27 are adjusted by automatically switching from the damping specification for high vehicle speed to the damping specification for low vehicle speed.

In a case where the changing operation of the damping specification for low vehicle speed is performed in step S09 (Yes in step S09), the changed damping specification for low vehicle speed in the base mode is applied by the ECM 11 (step S12). Then, a control signal is transmitted from the ECM 11 to the suspension controller 12, operations of the actuators 24 and 25 are controlled by the suspension controller 12, and the damping forces of the suspensions 26 and 27 are changed (step S06). In this way, during low-speed traveling at the vehicle speed V equal to or lower than the predetermined speed Va, it is possible to change from the plurality of damping specifications for low vehicle speed to any damping specification for low vehicle speed according to the road surface condition or the like.

As described above, according to the electronically controlled suspension 1 of the present embodiment, the damping forces of the suspensions 26 and 27 are appropriately adjusted in consideration of the traveling stability, the riding comfort, and the like by selecting any damping specification for low vehicle speed according to the traveling condition, the road surface condition, and the like during low-speed traveling. Since the damping specification for high vehicle speed is automatically set during high-speed traveling, the damping forces of the suspensions 26 and 27 are appropriately adjusted without depending on the damping force during low-speed traveling, and the traveling stability is improved.

In the present embodiment, switching is performed between the damping specification for low vehicle speed and the damping specification for high vehicle speed with reference to the predetermined speed, but a shift section for switching may be provided between a first speed and a second speed higher than the first speed. In this case, when the vehicle speed is accelerated to exceed the first speed, the ECM automatically shifts from the damping specification for low vehicle speed to the damping specification for high vehicle speed. When the vehicle speed is decelerated to or below the second speed, the ECM automatically shifts from the damping specification for high vehicle speed to the damping specification for low vehicle speed. The first speed may be set to vary for each low-speed base mode (each damping specification for low vehicle speed).

Figure 6:
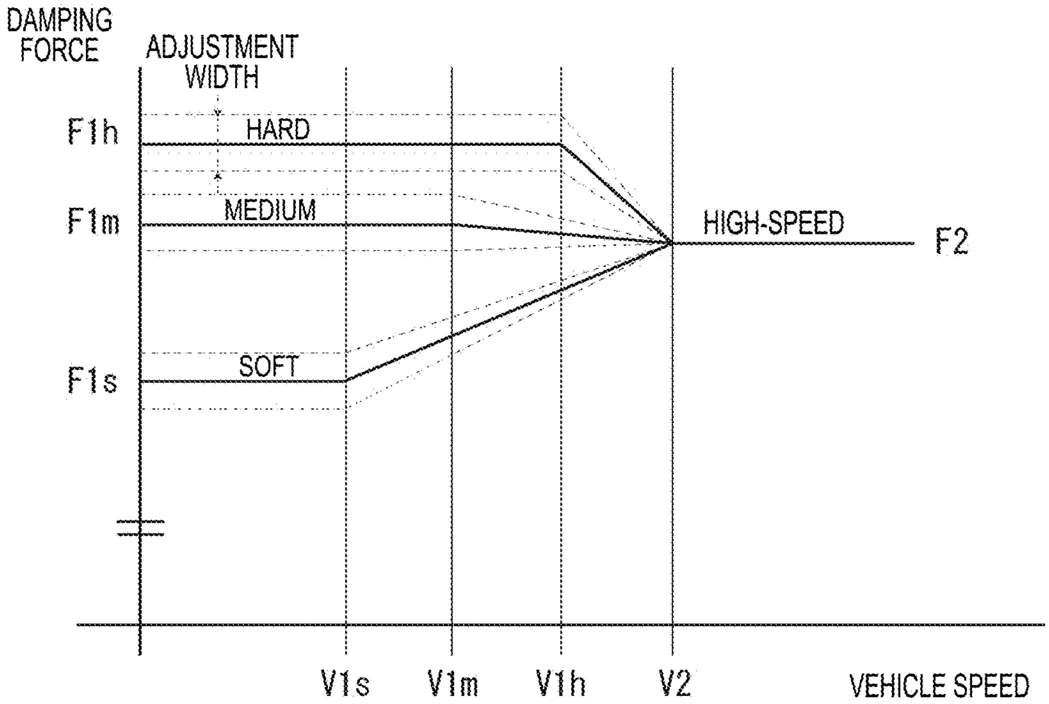
FIG. 6 is a diagram illustrating a relation between a speed and a damping force for each damping specification according to a first modification.

An electronically controlled suspension according to a first modification will be described with reference to FIG. 6. FIG. 6 is a diagram illustrating a relation between a speed and a damping force for each damping specification according to the first modification. Since a configuration of the electronically controlled suspension according to the first modification is the same as that of the electronically controlled suspension according to the present embodiment, the description thereof is omitted.

For example, as in the first modification illustrated in FIG. 6, the first speed in the soft mode is set to V1*s*, the first speed in the medium mode is set to V1*m*, and the first speed in the hard mode is set to V1*h*. The first speeds V1*s*, V1*m*, and V1*h* are set in an ascending order. Until the vehicle speed is accelerated from the first speeds V1*s*, V1*m*, and V1*h* to a second speed V2, the ECM 11 shifts from the damping specification for low vehicle speed to the damping specification for high vehicle speed. Until the vehicle speed is decelerated from the second speed V2 to the first speeds V1*s*, V1*m*, and V1*h*, the ECM 11 automatically shifts from the damping specification for high vehicle speed to the damping specification for low vehicle speed.

In the first modification, the damping force F1*h* of the damping specification for low vehicle speed in the hard mode and the damping force F1*m* of the damping specification for low vehicle speed in the medium mode are set to be higher than the damping force F2 of the damping specification for high vehicle speed in the high-speed mode. On the other hand, the damping force F1*s* of the damping specification for low vehicle speed in the soft mode is set to be lower than the damping force F2 of the damping specification for high vehicle speed in the high-speed mode. The adjustment width of the damping force is set for each damping specification for low vehicle speed. Between the first speeds V1*s*, V1*m*, and V1*h* and the second speed V2, shift sections (changing sections of the damping force) of the damping specifications for low vehicle speed are established, and in the shift sections of the damping specifications for low vehicle speed, the damping force changes according to the vehicle speed.

During shift from the damping specifications for low vehicle speed in the hard mode and the medium mode to the damping specification for high vehicle speed in the high-speed mode, the actuators 24 and 25 are controlled by the suspension controller 12 in a manner of decreasing the damping forces F1*h* and F1*m* to the damping force F2 until the first speeds V1*h* and V1*m* are accelerated to the second speed V2. During shift from the damping specification for high vehicle speed in the high-speed mode to the damping specifications for low vehicle speed in the hard mode and the medium mode, the actuators 24 and 25 are controlled by the suspension controller 12 in a manner of increasing from the damping force F2 to the damping forces F1*h* and F1*m* until the second speed V2 is decelerated to the first speeds V1*h* and V1*m*.

During shift from the damping specification for low vehicle speed in the soft mode to the damping specification for high vehicle speed in the high-speed mode, the actuators 24 and 25 are controlled by the suspension controller 12 in a manner of increasing the damping force F1*s* to the damping force F2 until the first speed V1*s* is accelerated to the second speed V2. During shift from the damping specification for high vehicle speed in the high-speed mode to the damping specification for low vehicle speed in the soft mode, the actuators 24 and 25 are controlled by the suspension controller 12 in a manner of decreasing from the damping force F2 to the damping force F1*s* until the second speed V2 is decelerated to the first speed V1*s*.

In the first modification, the second speed V2 corresponds to the predetermined speed Va according to the present embodiment. Therefore, in a case where the vehicle speed is equal to or lower than the second speed V2, any damping specification can be selected from the damping specifications for low vehicle speed in the soft mode, the medium mode, and the hard mode. However, the shift section is between the first speeds V1*s*, V1*m*, and V1*h* and the second speed V2, and the damping force is adjusted in accordance with an inclination of the damping specification when the damping specification for low vehicle speed is changed in the shift section. In the shift section, the selection of the damping specification may be prohibited. When the vehicle speed exceeds the second speed V2, the ECM 11 automatically applies the damping specification for high vehicle speed.

Figure 7:
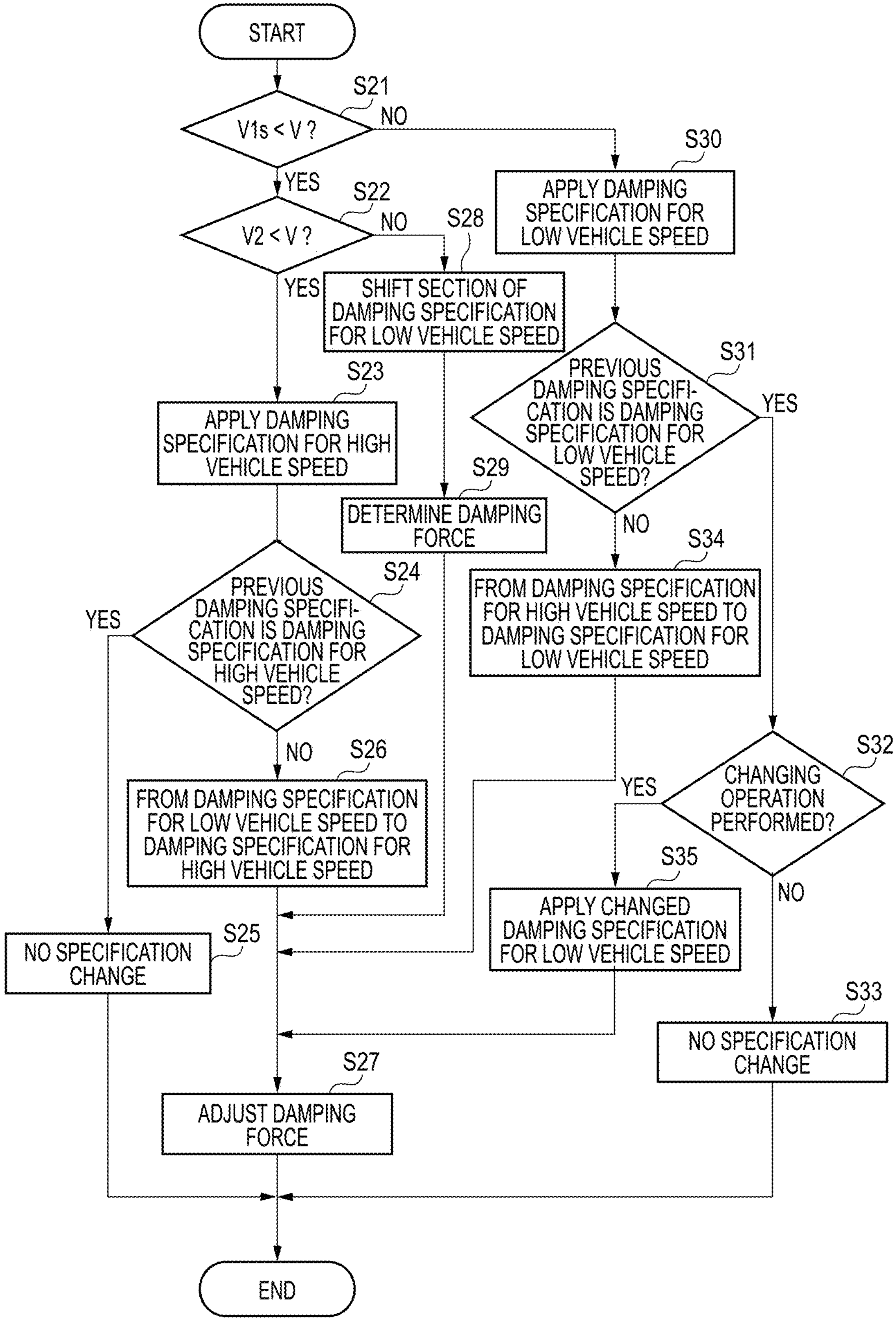
FIG. 7 is a flowchart illustrating a shift operation of the damping specification according to the first modification.

A shift operation of the damping specification will be described with reference to FIG. 7. FIG. 7 is a flowchart illustrating the shift operation of the damping specification according to the first modification. FIG. 7 illustrates the shift operation from the damping specification for low vehicle speed in the soft mode or the shift operation to the damping specification for low vehicle speed in the soft mode.

As illustrated in FIG. 7, it is determined whether the vehicle speed V is higher than the first speed V1*s* (step S21). In a case where the vehicle speed V is higher than the first speed V1*s* (Yes in step S21), it is determined whether the vehicle speed V is higher than the second speed V2 (step S22). In a case where the vehicle speed V is higher than the second speed V2 (Yes in step S22), it is determined that the vehicle is in high-speed traveling, and the damping specification for high vehicle speed is applied by the ECM 11 (step S23). In a case where the previous damping specification is the damping specification for high vehicle speed (Yes in step S24), the ECM 11 determines that there is no specification change, and the processing ends (step S25).

In a case where the previous damping specification is determined to be the damping specification for low vehicle speed in step S24 (No in step S24), the ECM 11 determines to shift from the damping specification for low vehicle speed to the damping specification for high vehicle speed (step S26). Then, a control signal is transmitted from the ECM 11 to the suspension controller 12, operations of the actuators 24 and 25 are controlled by the suspension controller 12, and the damping forces of the suspensions 26 and 27 are changed (step S27). In this way, in a case where the vehicle speed Vis accelerated to exceed the second speed V2, the damping forces of the suspensions 26 and 27 are adjusted by automatically shifting from the damping specification for low vehicle speed to the damping specification for high vehicle speed.

In a case where the vehicle speed V is determined to be equal to or lower than the second speed V2 in step S22 (No in step S22), it is determined that the vehicle is in the shift section of the damping specification for low vehicle speed between the first speed V1*s* and the second speed V2 (step S28). In the shift section, the ECM 11 determines the damping force according to the vehicle speed V (step S29). Then, a control signal is transmitted from the ECM 11 to the suspension controller 12, operations of the actuators 24 and 25 are controlled by the suspension controller 12, and the damping forces of the suspensions 26 and 27 are changed (step S27). In this way, the damping forces of the suspensions 26 and 27 are adjusted according to the vehicle speed in the shift section of the damping specification for low vehicle speed.

On the other hand, in a case where the vehicle speed Vis determined to be equal to or lower than the first speed V1*s* in step S21 (No in step S21), it is determined that the vehicle is in low-speed traveling, and the damping specification for low vehicle speed is applied by the ECM 11 (step S30). In a case where the vehicle speed is equal to or lower than the first speed V1*s*, the base mode setting field 31 and the damping force adjustment fields 32 and 33 of the display 16 are activated, and the operation switch 17 receives the changing operation of the damping specification. In a case where the previous damping specification is the damping specification for low vehicle speed (Yes in step S31) and the changing operation of the damping specification for low vehicle speed is not performed (No in step S32), the ECM 11 determines that there is no specification change, and the processing ends (step S33).

In a case where the previous damping specification is determined to be the damping specification for high vehicle speed in step S31 (No in step S31), the ECM 11 determines to shift from the damping specification for high vehicle speed to the damping specification for low vehicle speed (step S34). Then, a control signal is transmitted from the ECM 11 to the suspension controller 12, operations of the actuators 24 and 25 are controlled by the suspension controller 12, and the damping forces of the suspensions 26 and 27 are changed (step S27). In this way, in a case where the vehicle speed Vis decelerated to or below the first speed V1*s*, the damping forces of the suspensions 26 and 27 are adjusted by automatically shifting from the damping specification for high vehicle speed to the damping specification for low vehicle speed.

In a case where the changing operation of the damping specification for low vehicle speed is performed in step S32 (Yes in step S32), the changed damping specification for low vehicle speed in the base mode is applied by the ECM 11 (step S35). Then, a control signal is transmitted from the ECM 11 to the suspension controller 12, operations of the actuators 24 and 25 are controlled by the suspension controller 12, and the damping forces of the suspensions 26 and 27 are changed (step S27). In this way, during low-speed traveling at the vehicle speed V equal to or lower than the first speed V1*s*, it is possible to change from the plurality of damping specifications for low vehicle speed in the base mode to any damping specification for low vehicle speed according to the road surface condition or the like.

As described above, also in the electronically controlled suspension 1 according to the first modification, the damping forces of the suspensions 26 and 27 can be adjusted in consideration of the traveling stability, riding comfort, and the like during low-speed traveling, and the damping forces of the suspensions 26 and 27 are automatically adjusted during high-speed traveling, thereby improving the traveling stability. The shift section is provided between the first speed and the second speed, and a gradual shift can be implemented between the damping specification for low vehicle speed and damping specification for high vehicle speed. Since the first speed is set to vary for each damping specification for low vehicle speed, a shift timing can be changed according to the damping specification for low vehicle speed.

Figure 8:
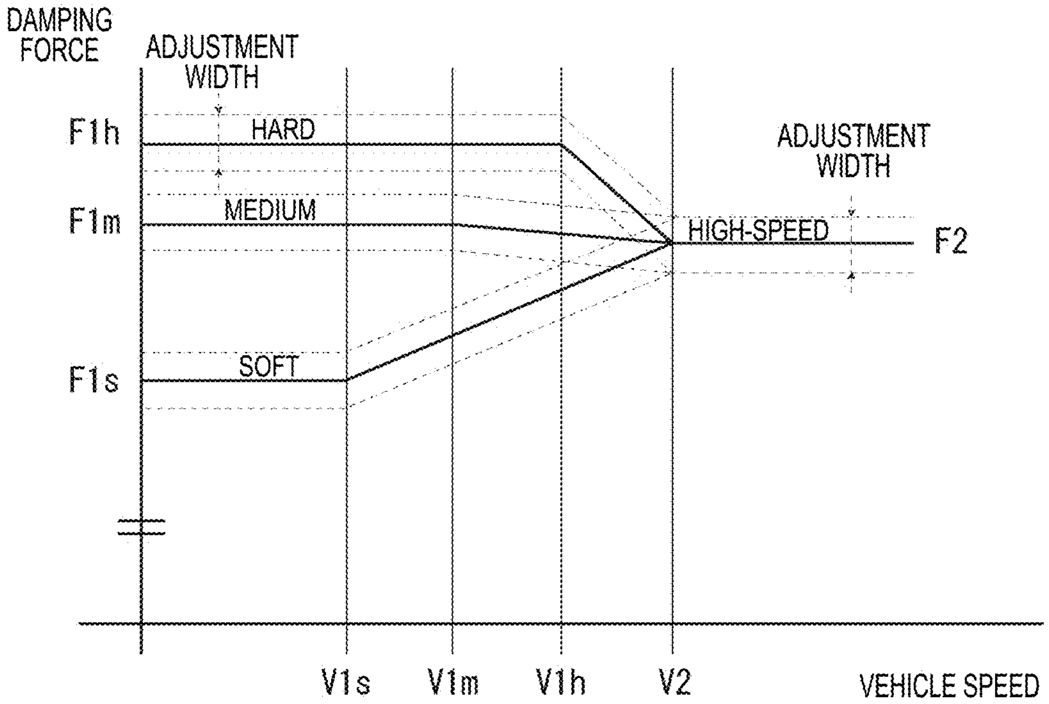
FIG. 8 is a graph illustrating a relation between a speed and a damping force for each damping specification according to a second modification.

In the first modification, the adjustment width of the damping force is provided for the damping specification for low vehicle speed, and the damping force of the damping specification for high vehicle speed is fixed, but the adjustment width of the damping force may be provided for both the damping specification for low vehicle speed and the damping specification for high vehicle speed as in a second modification illustrated in FIG. 8. In this case, the operation switch receives the adjustment of the damping force based on the damping specification for low vehicle speed and damping specification for high vehicle speed. Accordingly, the damping force is set according to the damping specification for low vehicle speed and the damping specification for high vehicle speed, and the damping force is finely adjusted based on the damping forces of the damping specification for low vehicle speed and the damping specification for high vehicle speed. The adjustment width of the damping force that is allowed to be adjusted under the damping specification for high vehicle speed is narrower than the adjustment width of the damping force that is allowed to be adjusted under the plurality of damping specifications for low vehicle speed, and the damping force can be adjusted with a simple operation during high-speed traveling.

In the present embodiment, the first modification, and the second modification, the damping specification for high vehicle speed is automatically applied during high-speed traveling, but the operation switch may receive the selection of any damping specification from the plurality of damping specifications not only during low-speed traveling but also during high-speed traveling. In this case, the operation switch is formed in a manner of being capable of receiving the selection of any damping specification from the plurality of damping specifications, and the ECM and the suspension controller operate the actuator with the selected damping specification. The number of damping specifications that are allowed to be selected during high-speed traveling is set to be smaller than the number of damping specifications that are allowed to be selected during low-speed traveling. The adjustment width under the damping specification for high vehicle speed may be set to be narrower than the adjustment width under the damping specification for low vehicle speed. Accordingly, the damping force of the suspension is appropriately adjusted in consideration of the traveling stability, the riding comfort, and the like by selecting any damping specification for low vehicle speed according to the traveling condition, the road surface condition, and the like during low-speed traveling. Selectable damping specification during high-speed traveling is less than that during low-speed traveling, and thus the damping specification can be selected by a simple operation of the operation device during high-speed traveling requiring attention to driving.

The predetermined speed according to the present embodiment can be appropriately changed according to the use. For example, the speed may be set to 140 km/h on an assumption of sports traveling in a circuit, or may be set to 100 km/h on the basis of a traveling speed on a highway.

Not limited to the saddle-riding vehicle, the electronically controlled suspension according to the present embodiment may be adopted in other types of saddle-riding vehicles. The saddle-riding vehicle is not limited to a general vehicle on which a driver rides on a seat in a posture straddling the seat, and includes a scooter-type vehicle on which the driver rides on the seat without straddling the seat.

As described above, a first aspect includes a suspension (26, 27) configured to damp vibration of a wheel of a saddle-riding vehicle; an actuator (24, 25) configured to change a damping force of the suspension; an operation device (operation switch 17) configured to receive a selection of any damping specification from a plurality of damping specifications for low vehicle speed; and a controller (ECM 11, suspension controller 12) configured to operate the actuator with the damping specification for low vehicle speed or a damping specification for high vehicle speed, in which the controller applies any damping specification for low vehicle speed during low-speed traveling at a speed equal to or lower than a predetermined speed, and the controller automatically applies the damping specification for high vehicle speed during high-speed traveling at a speed exceeding the predetermined speed. According to this configuration, the damping force of the suspension is appropriately adjusted in consideration of the traveling stability, the riding comfort, and the like by selecting any damping specification for low vehicle speed according to the traveling condition, the road surface condition, and the like during low-speed traveling. Since the damping specification for high vehicle speed is automatically set during high-speed traveling, the damping force is adjusted to an appropriate damping force without depending on the damping force during low-speed traveling, and the traveling stability is improved.

In a second aspect, according to the first aspect, the operation device is configured to receive an adjustment of the damping force based on the damping specification for low vehicle speed and the damping specification for high vehicle speed. According to this configuration, the damping force is set according to the damping specification for low vehicle speed and the damping specification for high vehicle speed, and the damping force is finely adjusted based on the damping forces of the damping specification for low vehicle speed and the damping specification for high vehicle speed.

In a third aspect, according to the second aspect, an adjustment width of the damping force that is allowed to be adjusted under the damping specification for high vehicle speed is narrower than an adjustment width of the damping force that is allowed to be adjusted under the plurality of damping specifications for low vehicle speed. According to this configuration, the adjustment width of the damping force is narrowed during high-speed traveling requiring attention to driving, and the damping force is adjusted by a simple operation.

In a fourth aspect, according to the first aspect, the operation device is configured to receive an adjustment of the damping force based on the damping specification for low vehicle speed during low-speed traveling, and the damping specification for high vehicle speed is fixed to a default damping force during high-speed traveling. According to this configuration, the damping force is set according to the damping specification for low vehicle speed during low-speed traveling, and the damping force is finely adjusted based on the damping force of the damping specification for low vehicle speed. Since the damping force of the damping specification for high vehicle speed is fixed during high-speed traveling, the damping force is adjusted to an appropriate damping force without being adjusted by the rider on the operation device.

In a fifth aspect, according to any aspect of the first to fourth aspects, the operation device is configured to receive a selection of the damping specification for low vehicle speed during low-speed traveling. According to this configuration, the damping specification can be changed to a desired damping specification according to a change in the road surface condition, the traveling condition, and the like during low-speed traveling.

In a sixth aspect, according to any aspect of the first to fifth aspects, when a vehicle speed is accelerated to exceed the predetermined speed, the controller switches from the damping specification for low vehicle speed to the damping specification for high vehicle speed, and when the vehicle speed is decelerated to or below the predetermined speed, the controller switches from the damping specification for high vehicle speed to the damping specification for low vehicle speed. According to this configuration, when the vehicle speed is accelerated to exceed the predetermined speed, it is possible to automatically switch from the damping specification for low vehicle speed to the damping specification for high vehicle speed, and when the vehicle speed is decelerated to or below the predetermined speed, it is possible to automatically switch from the damping specification for high vehicle speed to the damping specification for low vehicle speed.

In a seventh aspect, according to any aspect of the first to fifth aspect, when the vehicle speed is accelerated to exceed a first speed, the controller shifts from the damping specification for low vehicle speed to the damping specification for high vehicle speed, and when the vehicle speed is decelerated to or below a second speed that is higher than the first speed, the controller shifts from the damping specification for high vehicle speed to the damping specification for low vehicle speed. According to this configuration, when the vehicle speed is accelerated to exceed the first speed, it is possible to automatically shift from the damping specification for low vehicle speed to the damping specification for high vehicle speed, and when the vehicle speed is decelerated to or below the second speed, it is possible to automatically shift from the damping specification for high vehicle speed to the damping specification for low vehicle speed.

In an eighth aspect, according to the seventh aspect, the controller is configured to shift from the damping specification for low vehicle speed to the damping specification for high vehicle speed until the vehicle speed is accelerated from the first speed to the second speed, and the controller is configured to shift from the damping specification for high vehicle speed to the damping specification for low vehicle speed until the vehicle speed is decelerated from the second speed to the first speed. According to this configuration, the shift section is provided between the first speed and the second speed, and a gradual shift can be implemented between the damping specification for low vehicle speed and damping specification for high vehicle speed.

In a ninth aspect, according to the seventh aspect or the eighth aspect, the first speed is set to vary for each damping specification for low vehicle speed. According to this configuration, the shift timing can be changed according to the damping specification for low vehicle speed.

A tenth aspect includes a suspension configured to damp vibration of a wheel of a saddle-riding vehicle; an actuator configured to change a damping force of the suspension; an operation device configured to receive a selection of any damping specification from a plurality of damping specifications; and a controller configured to operate the actuator with the selected damping specification, in which the number of damping specifications that are allowed to be selected during high-speed traveling at a speed exceeding a predetermined speed is smaller than the number of damping specifications that are allowed to be selected during low-speed traveling at a speed equal to or lower than the predetermined speed. According to this configuration, the damping force of the suspension is appropriately adjusted in consideration of the traveling stability, the riding comfort, and the like by selecting any damping specification for low vehicle speed according to the traveling condition, the road surface condition, and the like during low-speed traveling.

Selectable damping specification during high-speed traveling is less than that during low-speed traveling, and thus the damping specification can be selected by a simple operation of the operation device during high-speed traveling requiring attention to driving.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronically controlled suspension comprising:

a suspension configured to damp vibration of a wheel of a saddle-riding vehicle;

an actuator configured to change a damping force of the suspension;

an operation device configured to receive a selection of a damping specification among a plurality of damping specifications for low vehicle speed; and a controller configured to operate the actuator with the damping specification for low vehicle speed or a damping specification for high vehicle speed, wherein the controller is configured to apply any damping specification for low vehicle speed, during only low-speed traveling at a speed equal to or lower than a predetermined speed, and the controller is configured to automatically apply the damping specification for high vehicle speed, during high-speed traveling at a speed exceeding the predetermined speed.

2. The electronically controlled suspension according to claim 1, wherein the operation device is configured to receive an adjustment of the damping force based on the damping specification for low vehicle speed and the damping specification for high vehicle speed.

3. The electronically controlled suspension according to claim 2, wherein an adjustment width of the damping force that is allowed to be adjusted under the damping specification for high vehicle speed is narrower than an adjustment width of the damping force that is allowed to be adjusted under the plurality of damping specifications for low vehicle speed.

4. The electronically controlled suspension according to claim 1, wherein the operation device is configured to receive an adjustment of the damping force based on the damping specification for low vehicle speed, during low-speed traveling, and the damping specification for high vehicle speed is fixed to a default damping force, during high-speed traveling.

5. The electronically controlled suspension according to claim 1, wherein the operation device is configured to receive a selection of the damping specification for low vehicle speed, during low-speed traveling.

6. The electronically controlled suspension according to claim 1, wherein in a case where a vehicle speed is accelerated to exceed the predetermined speed, the controller switches from the damping specification for low vehicle speed to the damping specification for high vehicle speed, and in a case where the vehicle speed is decelerated to or below the predetermined speed, the controller switches the damping specification from the damping specification for high vehicle speed to the damping specification for low vehicle speed.

7. The electronically controlled suspension according to claim 1, wherein in a case where the vehicle speed is accelerated to exceed a first speed, the controller shifts the damping specification from the damping specification for low vehicle speed to the damping specification for high vehicle speed, and in a case where the vehicle speed is decelerated to or below a second speed that is higher than the first speed, the controller shifts the damping specification from the damping specification for high vehicle speed to the damping specification for low vehicle speed.

8. The electronically controlled suspension according to claim 7, wherein the controller is configured to shift the damping specification from the damping specification for low vehicle speed to the damping specification for high vehicle speed, until the vehicle speed is accelerated from the first speed to the second speed, and the controller is configured to shift the damping specification from the damping specification for high vehicle speed to the damping specification for low vehicle speed, until the vehicle speed is decelerated from the second speed to the first speed.

9. The electronically controlled suspension according to claim 7, wherein the first speed is different for each damping specification for low vehicle speed.

10. An electronically controlled suspension comprising:

a suspension configured to damp vibration of a wheel of a saddle-riding vehicle;

an actuator configured to change a damping force of the suspension;

an operation device configured to receive a selection of a damping specification among a plurality of damping specifications; and a controller configured to operate the actuator with the selected damping specification, wherein the controller is configured to apply any damping specification for low vehicle speed during only the low-speed traveling, and wherein the number of damping specifications that are allowed to be selected during high-speed traveling at a speed exceeding a predetermined speed is smaller than the number of damping specifications that are allowed to be selected during low-speed traveling at a speed equal to or lower than the predetermined speed.

11. The electronically controlled suspension according to claim 1, wherein the operation device is configured to receive a selection input of any desired damping specification from a rider.

12. An electronically controlled suspension comprising:

a suspension configured to damp vibration of a wheel of a saddle-riding vehicle;

an actuator configured to change a damping force of the suspension;

an operation device configured to receive a selection of a damping specification among a plurality of damping specifications; and a controller configured to operate the actuator with the selected damping specification, wherein the number of damping specifications that are allowed to be selected during high-speed traveling at a speed exceeding a predetermined speed is smaller than the number of damping specifications that are allowed to be selected during low-speed traveling at a speed equal to or lower than the predetermined speed, and wherein the operation device is configured to receive a selection input of any desired damping specification from a rider.

* * * * *